United States Patent [19]

Fujisaki

[11] Patent Number: 4,789,928

[45] Date of Patent: Dec. 6, 1988

[54] AUCTION INFORMATION TRANSMISSION PROCESSING

[75] Inventor: Masataka Fujisaki, Machida, Japan

[73] Assignees: Flex Japan Inc.; Aucnet Inc., both of Tokyo, Japan

[21] Appl. No.: 8,886

[22] Filed: Jan. 30, 1987

[30] Foreign Application Priority Data

Feb. 17, 1986 [JP] Japan .................................. 61-033469

[51] Int. Cl.⁴ ............................ G06F 7/38; G06F 3/14
[52] U.S. Cl. ..................................... 364/401; 364/408
[58] Field of Search ............................... 364/401, 408; 340/825.02, 825.27; 370/94

[56] References Cited

U.S. PATENT DOCUMENTS

| | | | |
|---|---|---|---|
| 3,581,072 | 5/1971 | Nymeyer | 364/408 |
| 3,656,148 | 4/1972 | Belcher | 340/825.27 |
| 3,944,723 | 3/1976 | Fong | 340/825.02 |
| 4,445,171 | 4/1984 | Neches | 370/94 |

Primary Examiner—Jerry Smith
Assistant Examiner—Gail O. Hayes
Attorney, Agent, or Firm—Armstrong, Nikaido, Marmelstein & Kubovcik

[57] ABSTRACT

An auction information transmission processing system is constructed by connecting a most significant front computer to a host computer, arranging at least one stage of a plurality of intermediate front computers and a plurality of least significant front computers so as to be connectable to the most significant front computer in a tree-like configuration via communication lines, and arranging a plurality of dealer terminals so as to be connectable to each of the least significant front computers via communication lines. Each of the dealer terminals has basic pattern data storage means storing pattern data indicative of basic display screen pictures and exhibit data storage means storing data peculiar to articles on exhibit at an auction. When the system is started up, the host computer transmits a line connection signal to the front computers. After bidding starts, each of the front computers, in response to a command from the host computer, selects a predetermined number solely of bid-up signals from each of the dealer terminals and transmits these signals to a front computer. The most significant front computer selects only a predetermined number of bid-up signals and bids up the price of an exhibit being auctioned. After a pledge to buy an exhibit is made, the least significant front computers identify pledging members based on the member registration data, and data indicative of these members are transmitted to the front computers of higher significance.

5 Claims, 17 Drawing Sheets

Fig. 5 (A)

| RECORD NO. | MEMBER I.D. | RECORD NO. | MEMBER I.D. |
|---|---|---|---|
| 1 | A X X X X X X | 15 | A X X X X X X |
| 2 | A X X X X X X | 16 | K X X X X X X |
| 3 | A X X X X X X | 17 | A X X X X X X |
| 4 | K X X X X X X | ⋮ | ⋮ |
| ⋮ | ⋮ | ⋮ | ⋮ |
| | | 28 | A X X X X X X |

Fig. 5 (B)

| PORT NO. | RECORD NO. | PORT NO. | RECORD NO. |
|---|---|---|---|
| ① | 3 | ⑱ | 23 |
| ⑥ | 19 | ⑤ | 13 |
| ③ | 8 | ㉘ | 18 |
| ⋮ | ⋮ | ⋮ | ⋮ |
| ⋮ | ⋮ | ⋮ | ⋮ |

Fig. 5 (C)

| PORT NO. | PARTICIPATION FLAG | PORT NO. | PARTICIPATION FLAG |
|---|---|---|---|
| ① | 1 | ⑮ | 1 |
| ② | 0 | ⑯ | 1 |
| ⋮ | | ⋮ | ⋮ |
| ⋮ | | ㉘ | 0 |

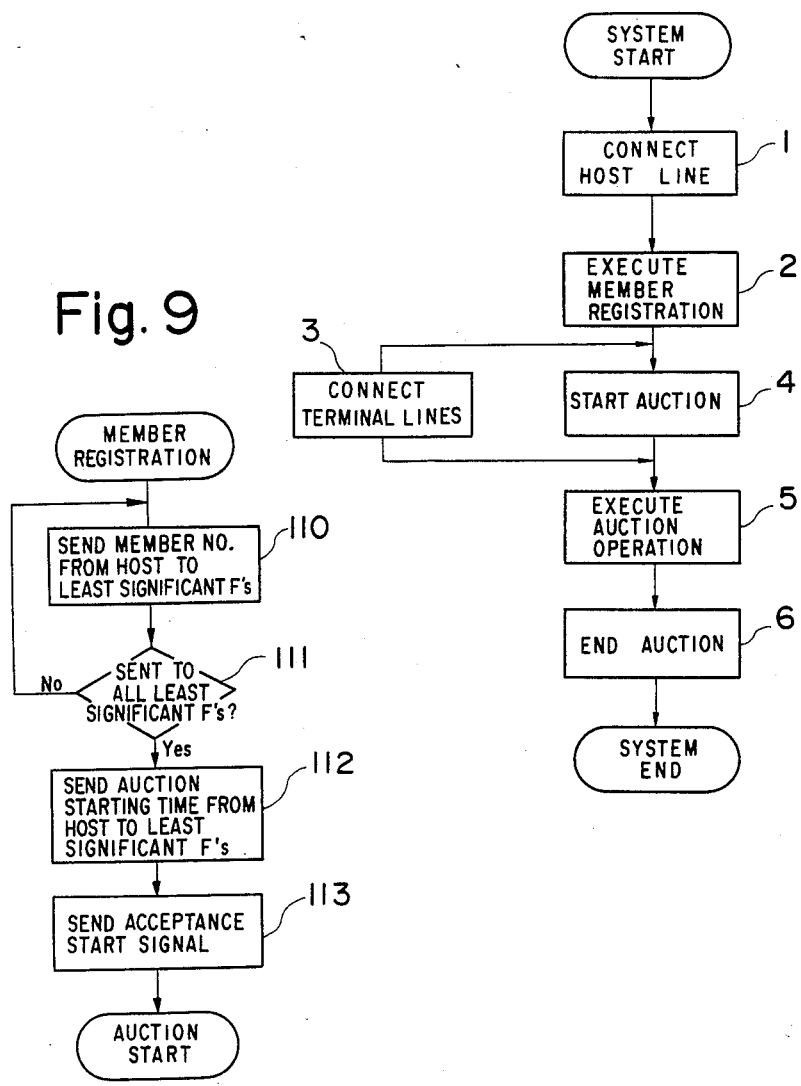

Fig. 20

| | |
|---|---|
| D1 | T N N O O N N N N N N N N N N N N N N N N |
| D2 | T N N N N N N N N N N N N N N N N N N N N |
| D3 | I X N N N N N N |
| D4 | I T N N N N |
| D5 | I R |
| D6 | I X N N N N N N N |
| D7 | I T N N N N |
| D8 | I K |
| D9 | I N |
| D10 | I O |
| D11 | O S |
| D12 | O T X X X X X X |
| D13 | O L N N N N |
| D14 | O D N N N N |
| D15 | 0 0 1 0 0 0 1 |
| D16 | 0 0 1 0 0 1 0 |
| D17 | X X X X X X X |
| D18 | X X X X X X X |
| D19 | X X X X X X X |
| D20 | X X X X X X X |
| D21 | I O X X X X X |
| D22 | R T |
| D23 | R D X N N N N N N N N N N |
| D24 | R D X N N N N N N N X N N N N N N N X N N N N N N N N N N |
| D25 | R F X N N N N N N N X N N N N N N N X N N N N N N N N N N |
| D26 | C N N N N |
| D27 | I L N N N N N N N |
| D28 | Z T |
| | |

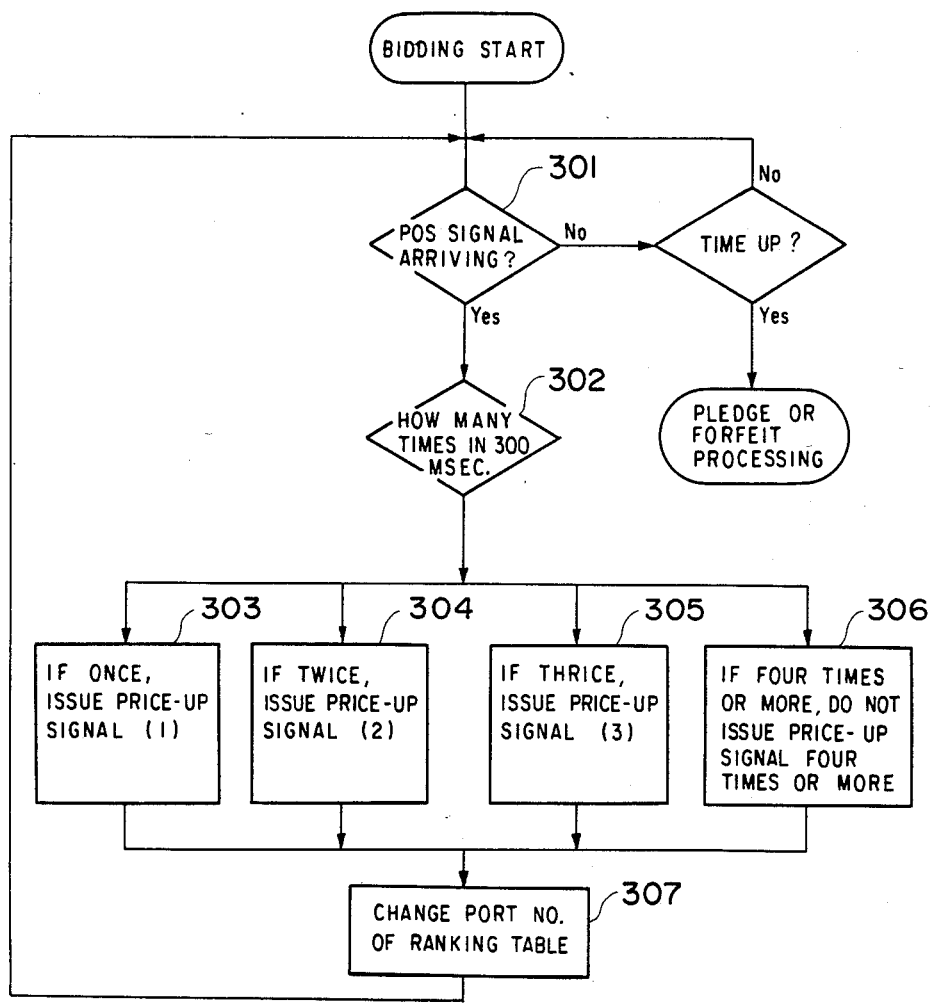

4,789,928

AUCTION INFORMATION TRANSMISSION PROCESSING

BACKGROUND OF THE INVENTION

This invention relates to an auction information transmission processing system which enables individuals scattered over a wide area to participate in an auction on a real-time basis without gathering at the auction site.

Conventionally, auctions of used cars or the like require that a used car to be presented at the auction by a participant be brought to the auction site by overland or other transportation means.

An auction system by which articles such as used cars can be auctioned automatically is available and includes an auction data processor installed at the auction site for processing predetermined data relating to the used cars to be presented at the auction, as well as data relating to the registered members of the auction group, display units installed at prescribed locations of the auction site for displaying various items of auction information, and bidding buttons also available at these locations so that they can be operated by those participating in the auction. A participant presses the bidding buttons while observing the auction information that appears on the screen of the display unit, thereby issuing a bid-up signal that is then processed by the auction data processor. In this manner a successful bidder can be determined automatically.

A problem with this conventional auctioning method in which participants bring the used cars to the auction site is that the trouble must be taken to transport the cars to the site. In addition, though the conventional system automates the auctioning off of the used cars in the manner described, it is still necessary for the participants to be present at the auction site.

A conceivable alternative to the foregoing would be to construct a system in which a host computer is connected directly to a number of dealer terminals via the leased telecommunication lines or public telephone lines of the Nippon Telegraph & Telephone Public Corp. (NTT) or the American Telephone & Telegraph Co., Ltd. (ATT). The system could then be used to carry out an auction by making it possible to transmit a variety of auction data between the host computer and the dealer terminals. With such a system, however, a huge amount of auction data such as the data relating to the articles being auctioned must be transmitted over the leased telecommunication lines and public telephone lines, and too much time would be required to transmit the data. Since this would make the instantaneous transmission of constantly changing auction data difficult, it would not be possible to hold the auction on a real-time basis.

SUMMARY OF THE INVENTION

Accordingly, an object of the peesent invention is to provide an auction information transmission processing system which enables individuals dispersed over a wide area to participate in an auction without gathering at the auction site.

In accordance with the invention, the foregoing object is attained by providing an information transmission processing system in an auction information transmission system constructed by connecting a single most significant front computer to a host computer, connecting a plurality of intermediate front computers and a plurality of least significant front computers to the most significant font computer in a tree-like configuration via communication lines, and connecting a plurality of dealer terminals to each of the least significant front computers via communication lines. Each dealer terminal has basic pattern data storage means storing pattern data indicative of a basic display screen picture and exhibit data storage means storing data peculiar to articles on exhibit at the auction. When the system is started up, the host computer transmits a line connection signal to the front computers, whereby the host computer is connected to each of the front computers. The host computer then transmits auction data such as member registration data to the least significant front computers, and the data are stored in these computers. Further, the least significant front computers are connected to the dealer terminals, and data are extracted from the basic pattern storage means and exhibit data storage means of the dealer terminals, and these data are displayed on the corresponding display screen, in response to a command from the host computer. The front computers select a predetermined number of bid-up signals input thereto in a predetermined period of time and bid up the price of the article being auctioned. After bidding starts, each front computer selects a predetermined number solely of bid-up signals from each dealer terminal in a predetermined period of time and transmits these signals to the front computer of higher significance. The most significant front computer selects a predetermined number of bid-up signals input thereto in a predetermined period of time and bids up the price. A pledge is deemed to be made when the price reaches a preregistered sell-off price or in response to a sell-off signal issued by a seller. The least significant front computers identify members, who have issued bid-up signals at the time of a pledge, based on member registration data, and data indicative of these members are transmitted to the front computers of higher significance to decide a successful bidder.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 shows management tables stored in a RAM of at least significant front computer, in which FIG. 5(A) is a member I.D. receiving table, FIG. 5(B) is a participant table, and FIG. 5(C) is a participant port table at the start of bidding;

FIG. 7 is a flowchart illustrating the overall flow of auction processing;

FIG. 9 is a flowchart illustrating the flow of member registration processing (step 2 in FIG. 7);

FIG. 20 is a view illustrating the format of data transmitted by the auction information transmission processing system of the present invention;

FIG. 21 is a flowchart illustrating the flow of POS bid-up signal selection processing executed within each front computer;

FIG. 22 is a view illustrating the format of POS bid-up signals; ,and

DESCRIPTION OF THE PREFERRED EMBODIMENT

A preferred embodiment in which the auction information transmission processing system of the invention is applied to the auctioning of used cars will now be described in detail.

Figure 1:
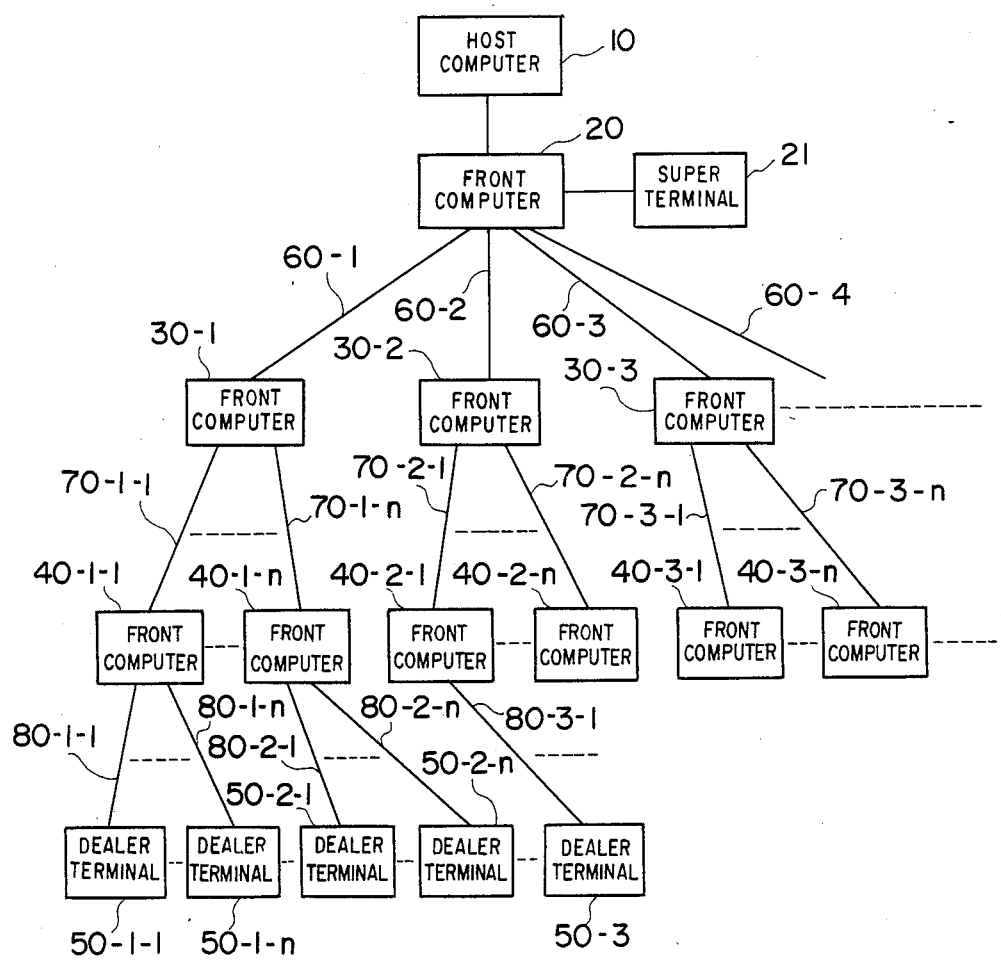
FIG. 1 is a block diagram illustrating the configuration of a used car auction information transmission system according to the present invention.

FIG. 1 is a block diagram illustrating the configuration of a used car auction information transmission system according to the present invention. The auction information transmission system includes a single host computer 10 having a single most significant front computer 20 connected thereto. The system further includes a plurality of intermediate front computers 30-1, 30-2, 30-3, . . . connected to the most significant front computer 20 via leased telecommunication lines 60-1, 60-2, 60-3, . . . , respectively. A plurality of least significant front computers 40-1-1 through 40-1-n, 40-2-1 through 40-2-n, 40-3-1 through 40-3-n . . . are connected to the intermediate front computers 30-1, 30-2, 30-3 . . . via leased telecommunication lines 70-1-1 through 70-1-n, 70-2-1 through 70-2-n, 70-3-1 through 70-3-n, . . . , respectively. Thus, the most significant front computer 20, the intermediate front computers 30 and the least significant front computers 40 are connected in a tree-like configuration via the leased telecommunication lines 60 and 70.

A plurality of dealer terminals 50-1-1 through 50-1-n, 50-2-1 through 50-2-n, . . . are connected to the least significant front computers 40-1-1 through 40-1-n, 40-2-1 through 40-2-n, 40-3-1 through 40-3-n, . . . via public telephone lines 80-1-1 through 80-1-n, 80-2-1 through 80-2-n, . . . , respectively. A super terminal 21 is connected to the most significant front computer 20.

Figure 2:
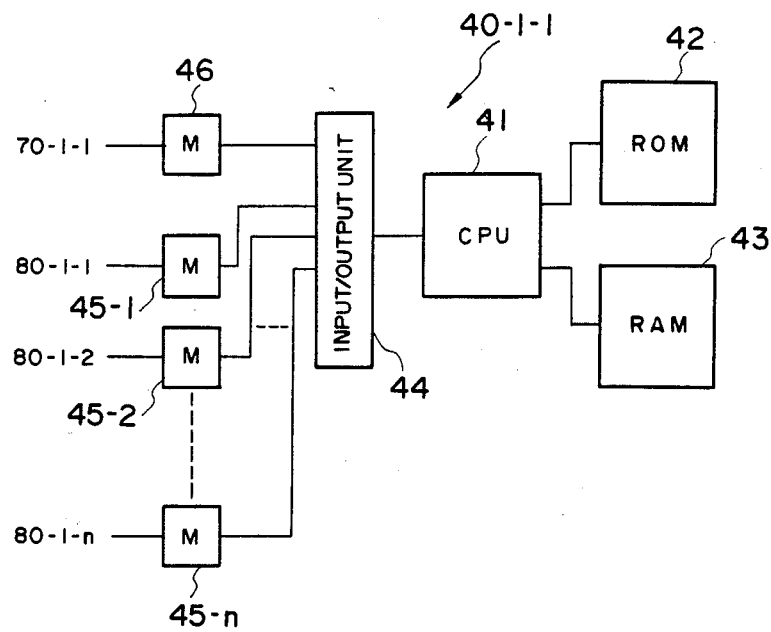
FIG. 2 is a block diagram illustrating the system configuration of a front computer.

FIG. 2 is a block diagram illustrating the system configuration of the least significant front computer 40-1-1. As shown in FIG. 2, the least significant front computer 40-1-1 includes a central processing unit (CPU) 41, a read-only memory (ROM) 42, a random-access memory (RAM) 43, and an input/output unit 44. A plurality of modems (M) 45-1 through 45-n and 46 are connected to the input/output unit 44. The leased telecommunication line 70-1-1 is connected to the modem 46, and the public telephone lines 80-1-1, 80-1-2, . . . , 80-1-n are connected to the modems 45-1, 45-2, . . . 45-n, respectively. A variety of programs, described below, are stored in the ROM 42, and various data relating to management tables, described below, are stored in the RAM 43. Though FIG. 2 shows the system configuration solely of the front computer 40-1-1, the system configurations of the intermediate front computers 30-1, 30-2, 30-3, . . . and least significant front computers 40-1-2 through 40-1-n, 40-2-1 through 40-2-n, 40-3-1 through 40-3-n, . . . are substantially the same.

Figure 3:
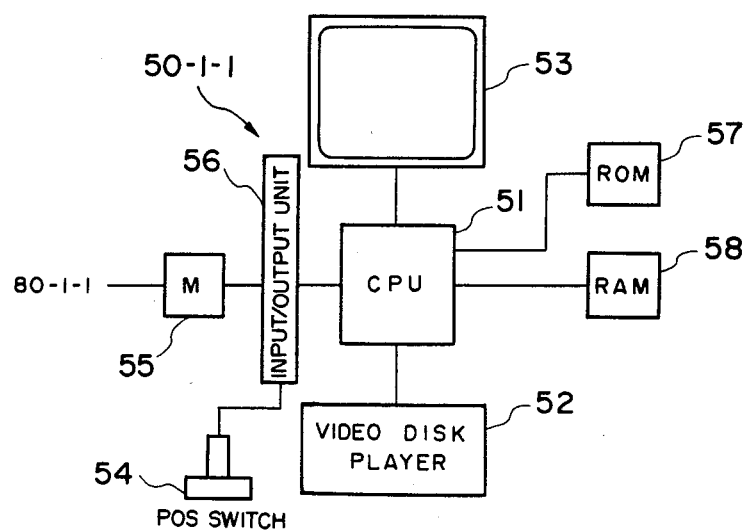
FIG. 3 is a block diagram illustrating the system configuration of a dealer terminal.

FIG. 3 is a block diagram illustrating the system configuration of the dealer terminal 50-1-1. As shown in FIG. 3, the dealer terminal 50-1-1 includes a central processing unit (CPU) 51, a video disk player 52, a display unit 53, a POS (point-of-sale) switch 54, an input/output unit 56, a read-only memory (ROM) 57 and a random-access memory (RAM) 58. The public telephone line 80-1-1 connected to the central processing unit 51 via a modem (M) 55.

Though FIG. 3 illustrates solely the system configuration of the dealer terminal 50-1-1, the other dealer terminals 50-1-2 through 50-1-n, 50-2-2 through 50-2-n, 50-3-1 through 50-3-n are of substantially the same configuration.

Auction processing in the used car auction information transmission system of FIG. 1 is executed in the sequence shown in FIG. 7. The sequence is as follows: host line connection processing (step 1), member registration processing (step 2), terminal line connection processing (step 3), auction start processing (step 4), auction operation processing (step 5) and auction termination processing (step 6). Each of these steps will be described below.

Laser disks storing the necessary auction data, such as the auction starting time, name, external appearance, year, model, evaluation and distance traveled of the automobiles to be exhibited, are distributed, as by a private delivery service, to the dealer terminals 50-1-1 through 50-1-n, 50-2-1 through 50-2-n, 50-3-1 through 50-3-n, . . . by the day before the start of the auction. Accordingly, since each of the dealer terminals 50-1-1 through 50-1-n, 50-2-1 through 50-2-n, 50-3-1 through 50-3-n, . . . will acquire the data relating to the used cars to be auctioned off, an individual wishing to participate in the auction loads the laser disk in the video disk player 52 to display the aforementioned auction data, namely the name, external appearance, year, model, evaluation and distance traveled of the automobiles to be exhibited. In this way the participant can get a preview of whether or not the desired used car is being offered for auction.

Figure 23:
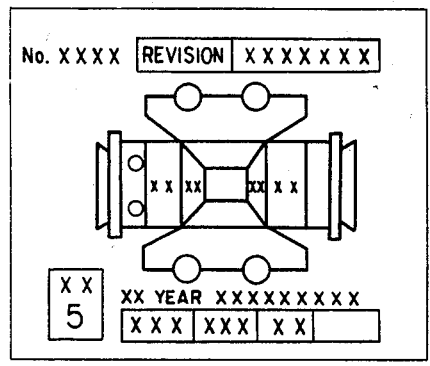
FIGS. 23(A)-(E) are views illustrating examples of pictures displayed on the display screen of a dealer terminal.
Figure 23:
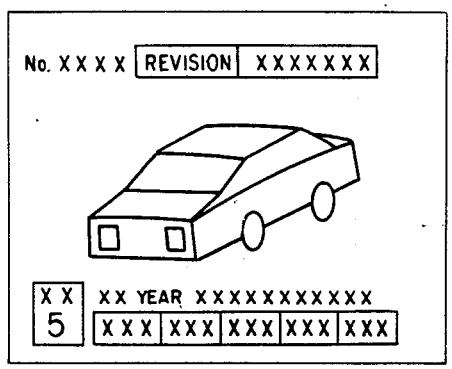
Figure 23:
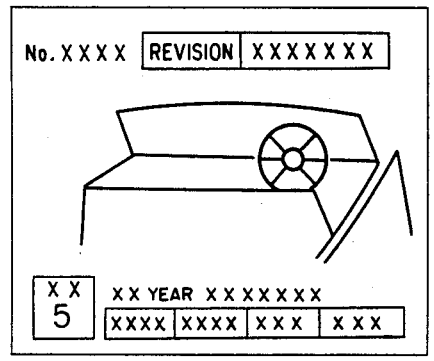
Figure 23:
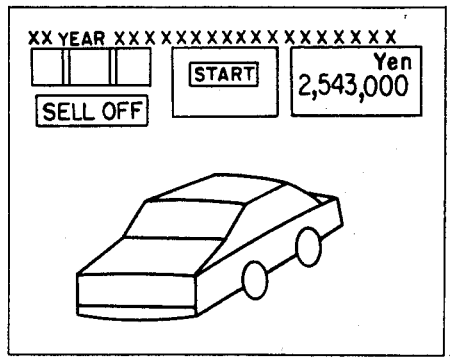
Figure 23:
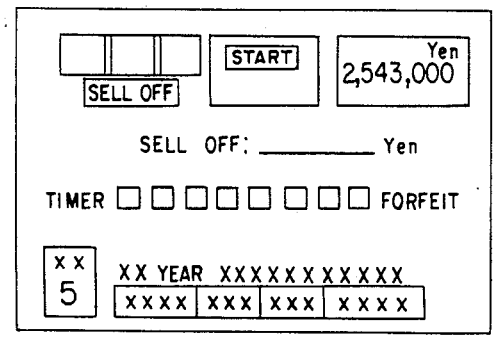

Pattern data relating to basic pictures of used cars offered for auction, as shown in (A) through (E) of FIG. 23, are stored beforehand in the ROM 57 and are capable of being displayed on the display screen of the display unit 53. Since these basic auction pictures are data common for used cars offered for auction and almost never change, no particular problems arise by storing them in the ROM 57 in advance.

Under these conditions, a command from the host computer 10 connects the most significant front computer 20 to the intermediate front computers 30-1, 30-2, 30-3, . . . via the leased telecommunication lines 60-1, 60-2, 60-3, . . . and connects the intermediate front computers 301-, 30-2, 30-3, . . . to the least significant front computers 40-1-1 through 40-1-n, 40-2-1 through 40-2-n, 40-3-1 through 40-3-n, . . . via the leased telecommunication lines 70-1-1 through 70-1-n, 70-2-1 through 70-2-n, 70-3-1 through 70-3-n, respectively. This is the host line connection processing step 1 of FIG. 7.

Next, the host computer 10 transmits registered member I.D.'s to the least significant front computers 40-1-1 through 40-1-n, 40-2-1 through 40-2-n, 40-3-1 through 40-3-n. The member I.D.'s are stored in the RAMs (FIG. 2) of each of the least significant front computers 40-1-1 through 40-1-n, 40-2-1 through 40-2-n, 40-3-1 through 40-3-n, . . . to register the members. This is the member registration processing step 2 of FIG. 7. The system then awaits calls from the dealer terminals 50-1-n, 50-2-1 through 50-2-n, 50-3-1 through 50-3-n.

Next, the dealer terminals 50-1-n, 50-2-1 through 50-2-n, 50-3-1 through 50-3-n, . . . place calls to the least significant front computers 40-1-1 through 40-1-n, 40-2-1 through 40-2-n, 40-3-1 through 40-3-n, and a connection is effected via the public telephone lines 80-1-n, 80-2-1 through 80-2-n, 80-3-1 through 80-3-n. The dealer terminals then transmit their I.D.'s to the least significant front computers 40. Terminal line connections are made upon checking whether these member I.D.'s agree with the member I.D.'s stored in the RAMs of the front computers 40-1-1 through 40-1-n, 40-2-1 through 40-2-n, 40-3-1 through 40-3-n. This is the terminal line processing step 3 of FIG. 7.

The host computer 10 then transmits an auction start signal to the dealer terminals 50-1-n, 50-2-1 through 50-2-n, 50-3-1 through 50-3-n, . . . to start the auction. This is the auction start processing step 4 of FIG. 7.

Next, the host computer sends a signal to the dealer terminals 50-1-n, 50-2-1 through 50-2-n, 50-3-1 through 50-3-n, . . . , whereby the basic picture pattern data stored in the ROM 57 (FIG. 3) and the used car data stored on the laser disk are looked up. Thus, specific auction data relating to the used cars available are displayed on the video display unit 53 (FIG. 3) via the video disk player 52. The last picture displayed on the screen is a prescribed seller picture at the exhibiting shop and a prescribed buyer picture at the other locations. Next, as will be described below, there is a transition to the auction operation. This is the auction operation step 5 of FIG. 7.

Lastly, the host computer 10 sends an auction terminal signal to the dealer terminals 50-1-n, 50-2-1 through 50-2-n, 50-3-1 through 50-3-n, . . . , whereby the auction termination processing step 6 of FIG. 7 is executed.

Hereinafter, the intermediate front computers 30-1, 30-2, 30-3, . . . shall be referred to generally as intermediate front computers 30, the least significant front computers 40-1-n, 40-2-1 through 40-2-n, 40-3-1 through 40-3-n, . . . as least significant front computers 40, the dealer terminals 50-1-n, 50-2-1 through 50-2-n, 50-3-1 through 50-3-n, . . . as dealer terminals 50, the leased telecommunication lines 60-1, 60-2, 60-3, . . . as leased telecommunication lines 60, the leased telecommunication lines 70-1-n, 70-2-1 through 70-2-1 through 70-3-n, . . . as leased telecommunication lines 70, and the public telephone lines 80-1-n, 80-2-1 through 80-2-n, 80-3-1 through 80-3-n, . . . as public telephone lines 80.

In the auction processing of steps 1 through 6, the exchange of data between the host computer 10 and the front computers 20, 30, 40 is performed through an ordinary transmission procedure up to the auction start step 4. When auction business starts, the minimum data necessary for the auction business are transmitted using the minimum number of bits in order to make the data transmission time as short as possible.

When the auction operation is in progress, a buyer at each of the dealer terminals 50 observes the last picture of used car auction information displayed on the screen of the display unit 53 and presses the POS switch 54 (FIG. 3) to transmit a bid-up signal. (If the buyer holds the POS switch 54 depressed, the bid-up signal is issued continuously. The manner in which the signal is issued is stored in the ROM.) However, if a large number of dealer terminals 50 send bid-up signals to the host computer 10 simultaneously through the least significant front computers 40, intermediate front computers 30 and most significant front computer 20, the most significant front computer 20 and the host computer 10 will have to process a large quantity of data. Since this processing will require a long period of time, it will not be possible to perform the auction business on a real-time basis. Accordingly, it is required that some means be provided for allowing the front computers 20, 30, 40 to select only a predetermined number of bid-up signals and send these selected signals to a more significant computer. A specific example of such means will now be described.

The front computers 20, 30, 40 are so adapted that more than three bid-up signals will not be transmitted to a more significant front computer within a time period of 300 msec. In other words, the number of POS bid-up signals is narrowed down within the least significant front computers 40, and the same is done within the intermediate front computers 30. The signals that remain are sent to the most significant front computer 20. The exchange of data in the performance of the auction operation is then performed between the front computers 20, 30, 40 and the dealer terminals 50 without the intervention of the host computer 10.

Figure 4:
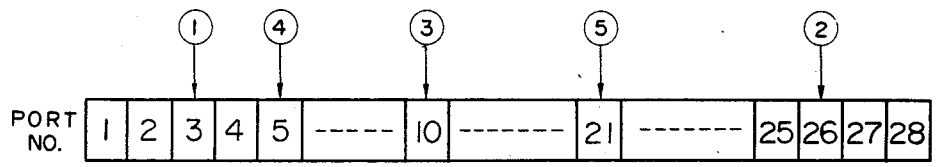
FIG. 4(A) is a view showing a port number table.
FIG. 4(B) is a view showing a ranking table illustrating the rank of ports to which POS (point-of-sale) bid-up signals are inputted.
Figure 4:
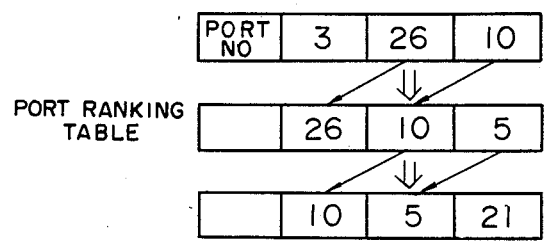

FIG. 4(A) is a table illustrating the numbers of ports to which the leased lines 60, 70 or public telephone lines 80 of the front computers 20, 30, 40 are connected. FIG. 4(B) is a ranking table illustrating the ranking of ports to which arriving POS bid-up signals are input. These tables are stored in the RAM 43 (FIG. 2) of each of the front computers 20, 30, 40.

If POS bid-up signals ①–⑤ are inputted to ports 1–28 in the port number sequence 3, 26, 10, 5, 21 within 300 msec, as shown in FIG. 4(A), three of these POS bid-up signals are sent to the more significant front computer. If there are more than three POS bid-up signals in 300 msec, the ranking table is updated, as shown in FIG. 4(B). More specifically, port numbers 3, 26, 10 stored in the ranking table are updated in ranking to 26, 10, 5, and then to 10, 5, 21, by entry of the bid-up signals 11④, ⑤.

FIG. 5 illustrates management tables stored in the RAM 43 (FIG. 2) of the least significant front computers 40. FIG. 5(A) is a member I.D. receiving table, FIG. 5(B) is a participant table, and FIG. 5(C) is a participant port table at the state of bidding.

As shown in FIG. 5(A), each least significant front computer 40 stores the member I.D.'s from the host computer 10 in the order of record numbers to create a member I.D. table, in which A represents a member I.D. the acceptance whereof has not be forbidden, and K represents a member I.D. whose acceptance has been forbidden. As shown in FIG. 5(B), the participant table is created by storing record numbers obtained from the dealer terminals 50 and accompanied by the accepted member I.D.'s, in the order of ports whose lines have been connected. As shown in FIG. 5(C), the participant port table at the state of bidding is created by setting flags to "1" for ports participating and to "0" for ports not participating when a start signal is received from the host computer 10.

When a pledge has been made, the individual making the pledge has the last port number in the POS bid-up signal receiving table indicated in the last row of FIG. 4(B). Therefore, the member I.D. of the person making the pledge is determined by referring to the participant table 5(C) prevailing at the start of bidding, then the participant table 5(B), and then the member I.D. table 5(A).

In the performance of the auction operation, a POS bid-up signal is input at the same time as the start of bidding, and the price is bid up at predetermined increments of e.g. 3000 yen (approximately 20 dollars) whenever a POS bid-up signal is input. A pledge is deemed to have been made, and pledge processing is then executed, when a sell-off price is reached or in response to a sell-off signal issued by the seller. If a POS bid-up signal does not arrive when a predetermined time (a predetermined count) is reached, this is treated as indicating a forfeit and forfeit processing is executed.

Figure 6:
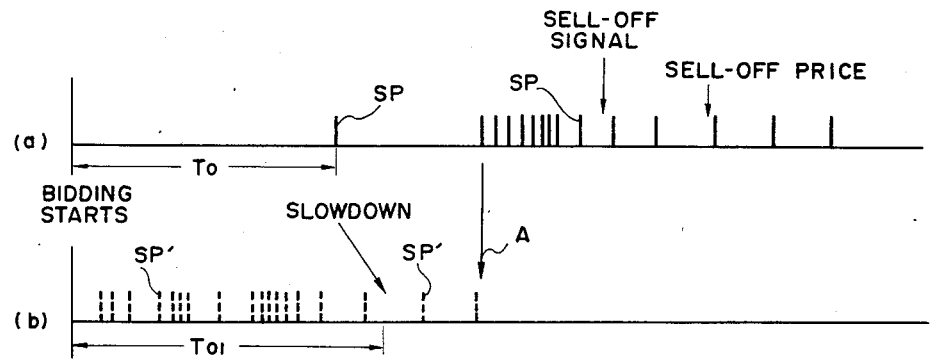
FIG. 6 is a view illustrating the generation of bid-up signals in an auction information transmission processing system according to the present invention.

In an actual auction operation, a number of POS bid-up signals do not arrive from the dealer terminals 50 at the same time that bidding starts. Rather, as shown in FIG. 6, participants ordinarly observe developments at the start and refrain initially from sending POS bid-up signals. The POS switches 54 (FIG. 3) start to be used after a certain period of time T₀. There are also instances where the participants refrain from taking action until the bidding ends in forfeiture. Accordingly, in the illustrated embodiment, the host computer 10 issues dummy POS bid-up signals SP' in order to promote bidding in the early stages of the auction, as shown in FIG. 6. Whenever the bid-up signals SP' are generated, the price is bid up in predetermined increments. However, since the bid-up signal SP' is a dummy signal to the last, a situation in which a pledge is obtained based on this signal must be avoided. Therefore, as shown in (b) of FIG. 6, measures are taken such as a slowing down of the rate at which the bid-up signals SP' are issued upon passage of a predetermined period of time or when a predetermined count is reached. Thus, the arrangement is such as to arrive at a successful pledge to the greatest degree possible.

The processing of steps 1 through 7 of FIG. 7 will now be described in detail on the premise that the aforementioned holds. FIG. 20, which relates to such processing, is a view showing the format of data transmitted from the host computer 10 to the front computers 20, 30, 40 or vice versa, and from the front computers 20, 30, 40 to the dealer terminals 50 or vice versa.

Figure 8:
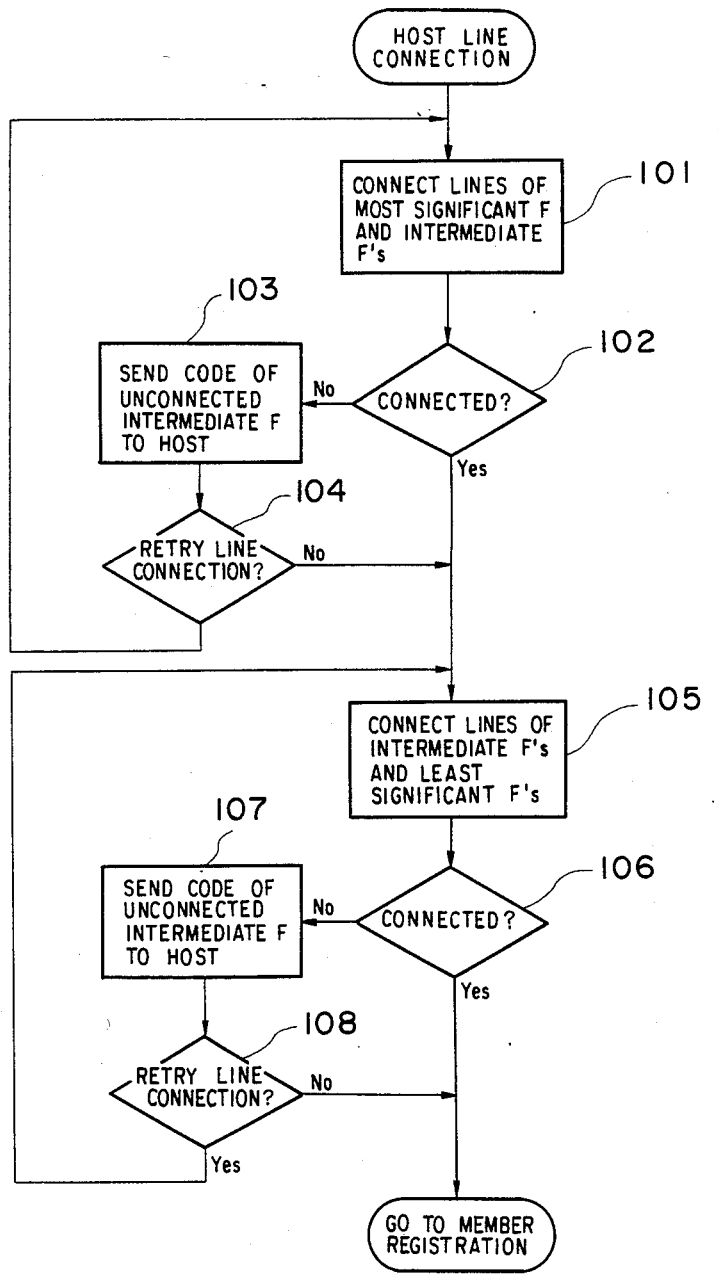
FIG. 8 is a flowchart illustrating the flow of host line connection processing (step 1 in FIG. 7)

FIG. 8 is a flowchart illustrating the flow of host line connection processing (step 1 of FIG. 7). First, at step 101 of the flowchart, the host computer 10 sends telephone number data (D1 in FIG. 20) indicative of the intermediate front computers 30 to the most significant front computer 20, and the most significant front computer 20 places a call to the intermediate front computers 30, whereby the most significant front computer 20 and the intermediate front computers 30 are connected via the leased lines 60. It is then determined at step 102 whether the lines are connected. If an unconnected line exists, the code of the unconnected intermediate front computer 30 is transmitted to the host computer 10 at a step 103. It is then determined at a step 104 whether to retry making a connection with the unconnected intermediate front computer 30. If the answer is YES, then the program returns to step 101; if NO, then the program proceeds to the next step 105.

If no lines are found to be unconnected at step 102, the host computer 10 transmits telephone number data (D2 in FIG. 20) indicative of the least significant front computers 40 to the intermediate front computers 30 and the intermediate front computers 30 place calls to the least significant front computers 40, whereby the intermediate front computers 30 and the least significant front computers 40 are connected via the leased lines 70 (step 105). It is then determined at step 106 whether the lines are connected. If there are no unconnected lines, then the program proceeds to member registration processing. If an unconnected line exists, the code of the unconnected least significant front computer 40 is transmitted to the host computer 10 at a step 107. It is then determined at a step 108 whether to retry making a connection with the unconnected least significant front computer 40. If the answer is YES, then the program returns to step 105; if NO, then the program proceeds to member registration processing.

FIG. 9 is a flowchart illustrating the flow of member registration processing (step 2 in FIG. 7). First, at step 110, the host computer 10 transmits, to the least significant front computers 40, memer I.D. data (D3 of FIG. 20) comprising member I.D.'s of members whose acceptance is forbidden and member I.D.'s of members whose acceptance is not forbidden. These data are stored in the RAMs 43 of the least significant front computers 40 (FIG. 2).

A determination is made at a step 111 as to whether the member I.D.'s have been sent to all of the least significant front computers 40. If a least significant front computer 40 which has not received the I.D. data exists, then the program returns to step 110 and it is again attempted to send the member I.D. data. When the I.D. data have been sent to all of the least significant front computers 40, the host computer 10 transmits auction start time data (D4 in FIG. 20) to the least significant front computers 40 and then transmits acceptance start signal data indicative of terminal line connection (step 113), whereby the program proceeds to auction start processing.

Figure 10:
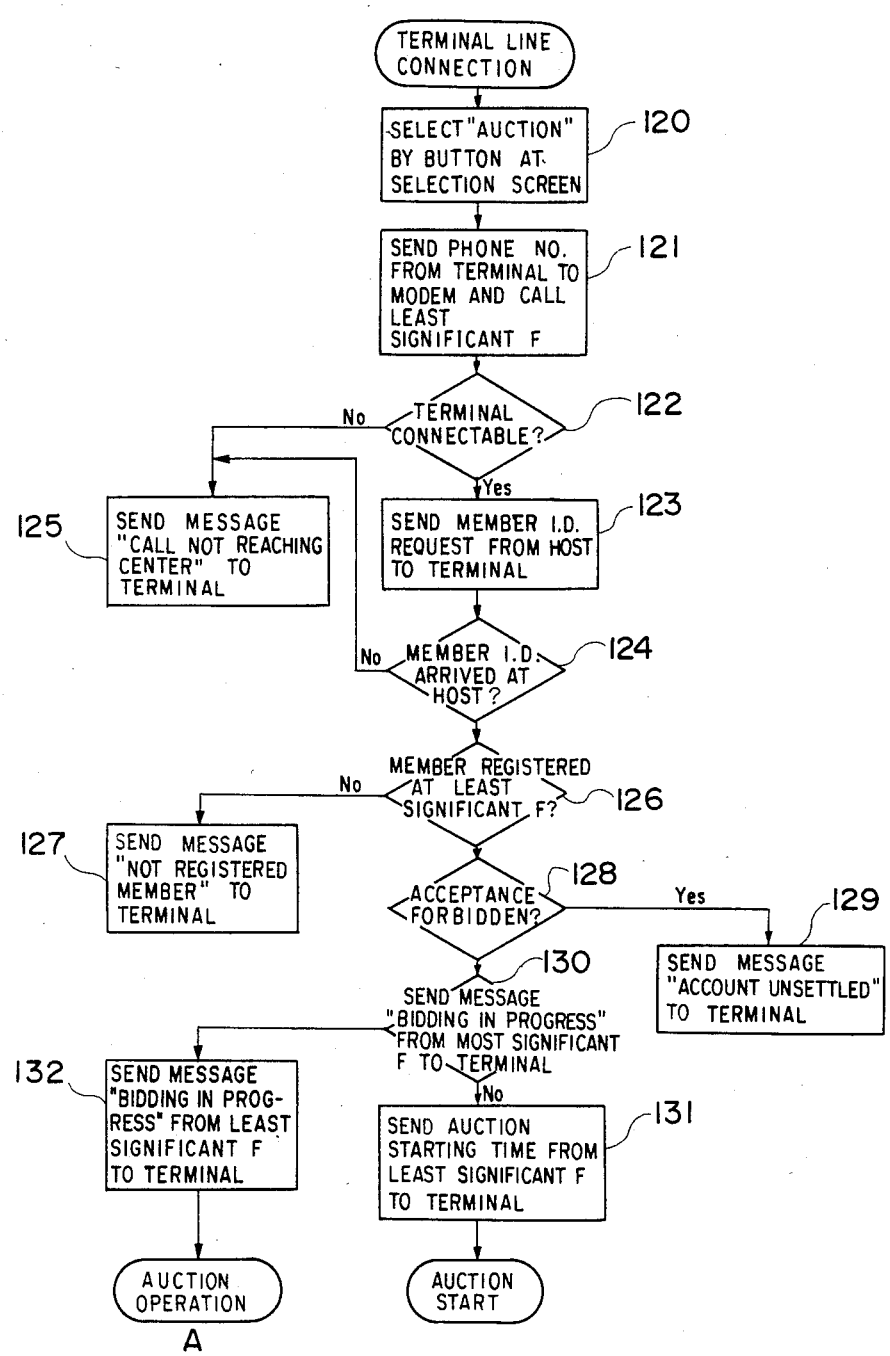
FIG. 10 is a flowchart illustrating the flow of terminal line connection processing for connecting dealer terminals to least significant front computers via public telephone lines.

FIG. 10 is a flowchart illustrating the flow of terminal line connection processing for connecting the dealer terminals 50 to the least significant front computers 40 via the public telephone lines 80. At each of the dealer terminals 50, auction is selected by button at a selection screen of the display unit 53 (step 120) and telephone signals are sent from the dealer terminals 50 via the modems 55 (FIG. 3) to place calls to the least significant front computers 40 (step 121).

The least significant front computers 40 determine at a step 122 whether the dealer terminals 50 are in a connectable state. If a YES answer is received, the host computer 10 transmits data (D5 in FIG. 20) requesting member I.D.'s to the dealer terminals 50 (step 123). In response, the dealer terminals 50 transmit their I.D.'s (D6 in FIG. 20) and it is determined at step 124 whether these member I.D.'s have reached the host computer 10. If an I.D. has not arrived, a message such as CALL NOT REACHING CENTER is sent to the particular dealer terminal 50 at step 125. The same message is issued by a least significant front computer 40 when it is found at the step 122 that a dealer terminal 50 is not in a connectable state.

When member I.D.'s are found to reach the host computer 10 at the step 124, it is determined at step 126 whether these member I.D.'s agree with the members registered in the least significant front computers 40. If a NO answer is received at the step 126, data (D9 in FIG. 20) for issuing a message reading NOT REGISTERED MEMBER are transmitted to the dealer terminals 50 at step 127.

If a member is found to be registered in a least significant front computer 40 at the step 126, then it is determined at step 128 whether the member is one whose acceptance is not been forbidden. If the member is one whose acceptance is forbidden, then data (D8 in FIG. 20) for issuing a message reading ACCOUNT UNSETTLED is transmitted to the dealer terminal 50 at a step 129.

If the member is not one whose acceptance is forbidden, then it is determined at a step 130 whether bidding is in progress. Since bidding will not be in progress at this point, the least significant front computers 40 send auction start time data (D7 in FIG. 20) to the dealer terminals 50, thereby displaying the time at which the auction is to start. The program then proceeds to auction start processing. If bidding is in progress at the step 130, the least significant front computers 40 transmit data (D10 in FIG. 20) for displaying a picture reading BIDDING IN PROGRESS to the dealer terminals 50 (step 132). The program then proceeds to auction operation processing.

Figure 11:
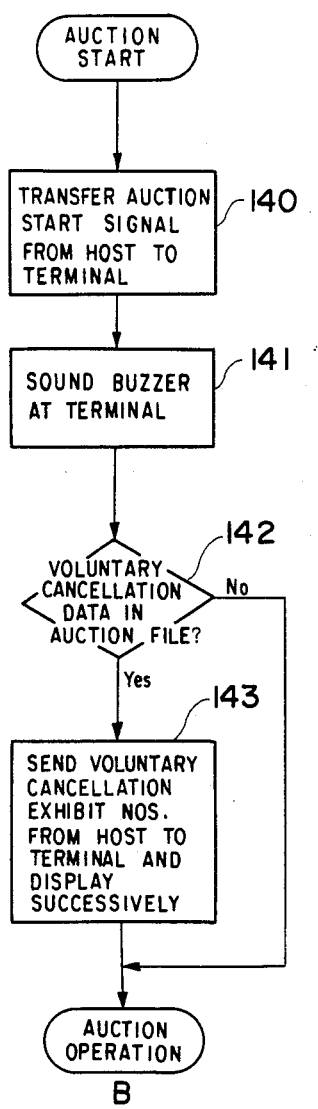
FIG. 11 is a flowchart illustrating the flow of auction start processing.

FIG. 11 is a flowchart illustrating the flow of auction start processing. This processing includes a first step 140 at which the host computer 10 transmits an auction start signal to the dealer terminals 50. The signal causes a sound, produced by a buzzer or the like and indicating the start of an auction, to be produced at each dealer terminal 50 at a step 141. Next, the host computer 10 determines at a step 142 whether the auction file contains voluntary cancellation data. If the answer is NO, the program proceeds to auction operation processing; if YES, then the host computer 10 causes the dealer terminals 50 to successively display data (D14 in FIG. 20) indicative of voluntarily cancelled exhibit numbers (step 143). The program then proceeds to auction operation processing.

Figure 12:
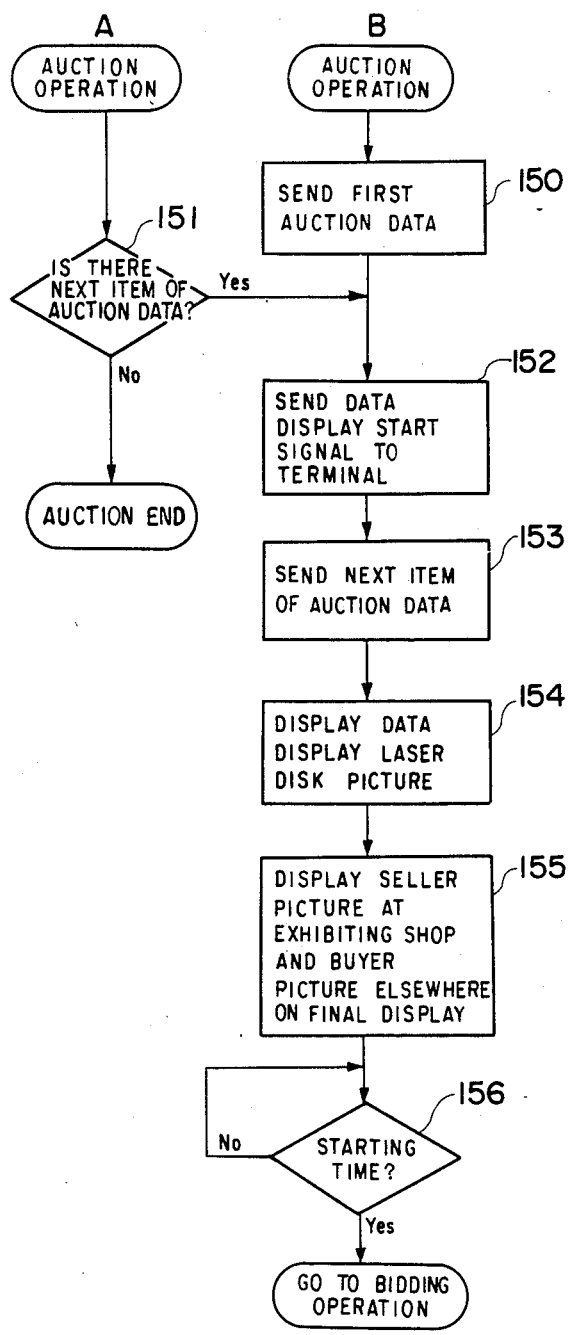
FIG. 12 is a flowchart illustrating the flow of auction operation processing.

FIG. 12 is a flowchart illustrating the flow of auction operation processing. When the auction start processing of FIG. 11 ends, the host computer 10 transmits first auction data (D12 in FIG. 20) at a step 150, sends a data display start signal (D13 in FIG. 20) to the dealer terminals 50 at a step 152, and then transmits the next item of auction data (D12 in FIG. 20) at a step 153. Each dealer terminal 50 selects desired basic display picture data stored in the ROM 57 and desired exhibit data, which are stored on a video disk, from the video disk player 52, and these data are displayed on the display unit 53 (step 154) [see (A), (B) and (C) in FIG. 23]. Next, a picture indicative of the seller [FIG. 23(E)] appears as the final picture on the display unit 53 of the exhibiting shop's dealer terminal 50, and a picture indicative of the buyer [FIG. 23(D)] is displayed at the other dealer terminals (step 155).

Next, it is determined at a step 156 whether a bidding operation start time has arrived. If such time has arrived, the program proceeds to bidding operation processing. If a picture reading BIDDING IN PROGRESS has been sent from the least significant front computers 40 to the dealer terminals 50 at the step 132 of terminal line connection processing shown in FIG. 10, then it is determined at step 151 of FIG. 12 whether the next item of auction data is available. If the answer is YES, the program proceeds to the step 152; if NO, then the program proceeds to auction terminal processing. In a bidding operation during an auction, the exchange of data takes place solely between the front computers 20, 30, 40 and the dealer terminals 50 using a predetermined number of bits (seven in the illustrated embodiment), and the host computer 10 does not take part in the data exchange. In a bidding operation, the price is bid up at predetermined increments by the POS bid-up signals from the POS switches 54 (FIG. 3) of the dealer terminals 50. The program proceeds to sell-off processing when a seller issues a sell-off signal or when a sell-off price registered in advance by a seller is reached. In an actual bidding operation, however, the host computer 10 transmits bid-up signals at a predetermined period and the period is slowed down to improve the opportunity for obtaining a pledge [see (a) and (b) of FIG. 6]. A specific example of such processing will be described hereinbelow.

Figure 13:
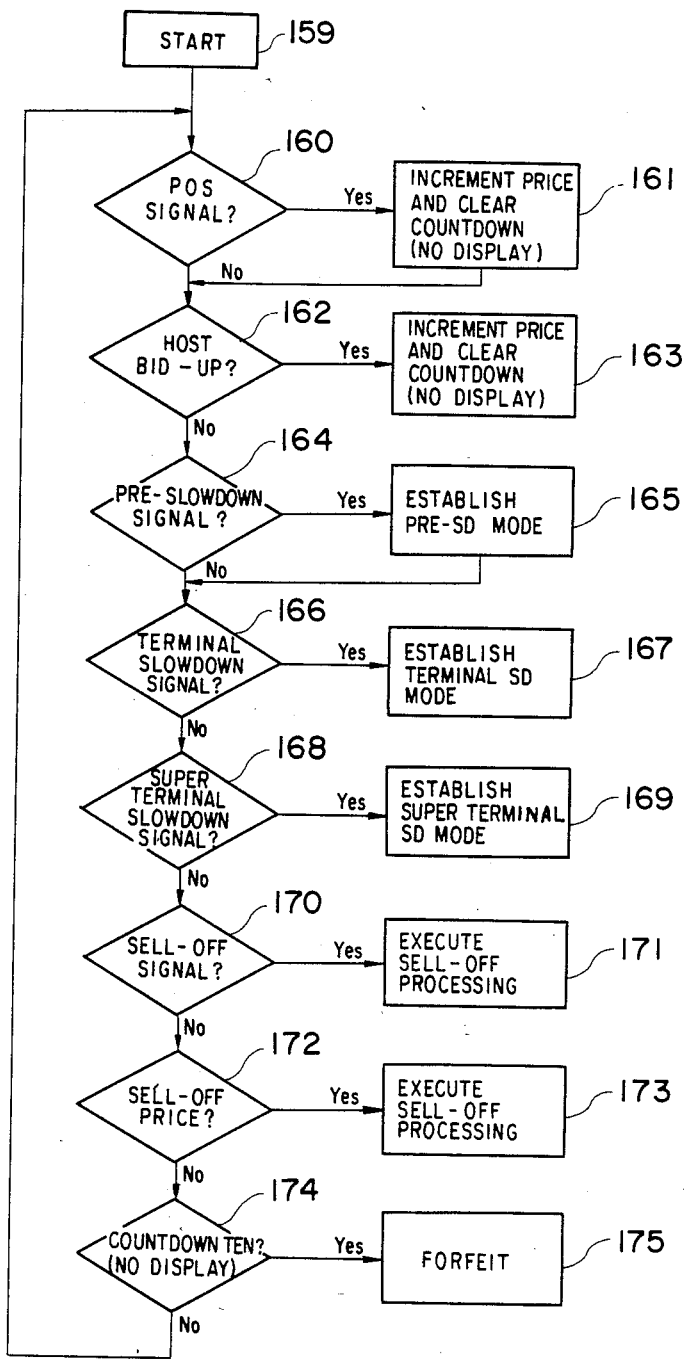
FIG. 13 is a flowchart illustrating the flow of main bidding processing.

FIG. 13 is a flowchart illustrating the flow of main bidding operation processing. The most significant front computer 20 transmits a start signal (D16 in FIG. 20) at a step 159. This is followed by step 160, at which it is determined whether POS bid-up signals (D20 in FIG. 20) are arriving from the POS switches 54 of the dealer terminals 50. If the answer is YES, a count-up signal (D28 in FIG. 20) for raising the price one step by a predetermined amount is transmitted to the dealer terminals 50, and countdown is cleared (step 161).

If the answer is NO at the step 160, then it is determined at step 162 whether a host bid-up signal (D26 in FIG. 20) is arriving from the host computer 10. If the answer is YES, the aforementioned price count is incremented at a step 163. If the answer at the step 162 is NO, then it is determined at step 164 whether a pre-slowdown signal is arriving. It the answer is YES at this step, then a pre-slowdown mode is established at step 165. If a pre-slowdown signal is not arriving, it is determined at a step 166 whether terminal slowdown signals (D24 in FIG. 20) are arriving from the exhibiting dealer terminals 50. If the answer is YES, then a terminal slowdown processing mode is established at a step 167. If the answer is NO, on the other hand, then it is determined at a step 168 whether a super terminal slowdown signal (D24 in FIG. 20) is arriving from the super terminal 21 (FIG. 1). If the answer is YES, a super terminal slowdown processing mode is established at a step 169. If the answer is NO, then it is determined at a step 170 whether a sell-off signal (D19 in FIG. 20) is arriving. If the answer is YES, the program proceeds to sell-off processing at step 171; if NO, then it is determined at step 172 whether the bidded up price has reached the sell-off price. If it has, the program proceeds to sell-off processing at a step 173. If the bidded up price has not reached the sell-off price, then it is determined at step 174 whether the countdown dependent upon the countdown signal (D23 in FIG. 20) is a predetermined countdown value corresponding to bidding decision time. (In the illustrated embodiment, the countdown value is a count of ten, and one count corresponds to 300 msec.) If a YES answer is received at the step 174, the program proceeds to forfeit processing at step 175; if the answer is NO, then the program returns to the step 160 to repeat the above processing.

Figure 14:
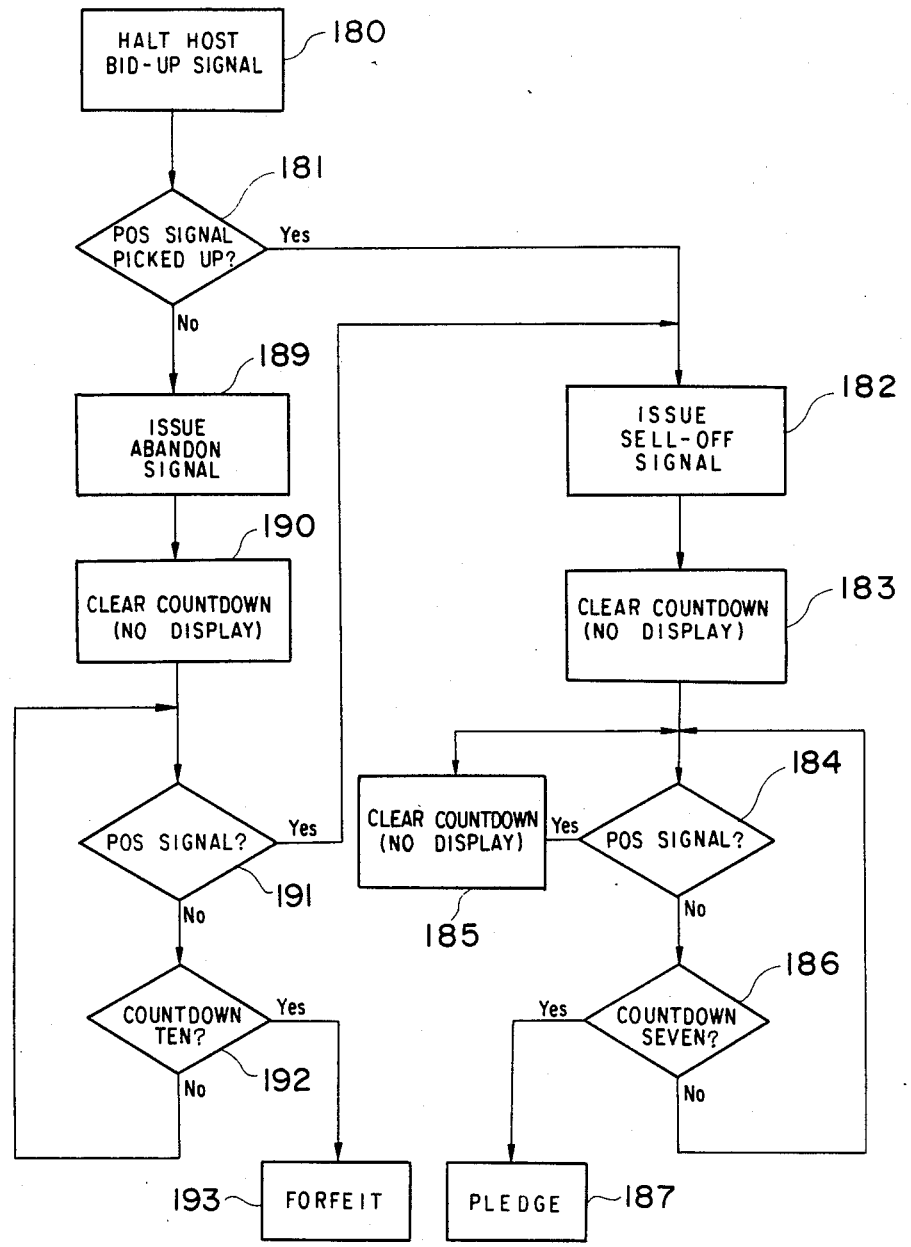
FIG. 14 is a flowchart illustrating the flow of sell-off processing (steps 171 and 173) in FIG. 13.

FIG. 14 is a flowchart illustrating the flow of sell-off processing (steps 171 and 173 in FIG. 13). Sell-off processing includes a step 180 of halting the POS bid-up signals, and a step 181 of determining whether a POS bid-up signal has been picked up. If the answer at the step 181 is YES, then a sell-off signal is issued at a step 182 and the countdown is cleared at a step 183. In this case, nothing appears on the screen of the display unit 53.

Next, it is determined at a step 184 whether a POS bid-up signal is arriving. If the answer is NO, it is determined at a step 186 whether the countdown is a predetermined value (seven in the illustrated embodiment); if YES, then the program proceeds to pledge processing at a step 187.

If a POS bid-up signal is found to be present at the step 184, then the countdown is cleared and the program returns to the step 184. If the countdown is found not to be the predetermined value at the step 186, then the program likewise returns to the step 184.

If a POS bid-up signal is not picked up at the step 181, then an abandon signal is issued at step 189, the countdown is cleared at a step 190, and it is determined at a step 191 whether a POS bid-up signal is present. If the answer is YES, then the program proceeds to the step 182 and processing similar to the foregoing is executed.

If a NO answer is obtained at the step 191, then it is determined at step 192 whether the countdown has a value of ten. If the answer is YES, the program proceeds to forfeit processing at step 193; if NO, then the program proceeds to the step 191.

Figure 15:
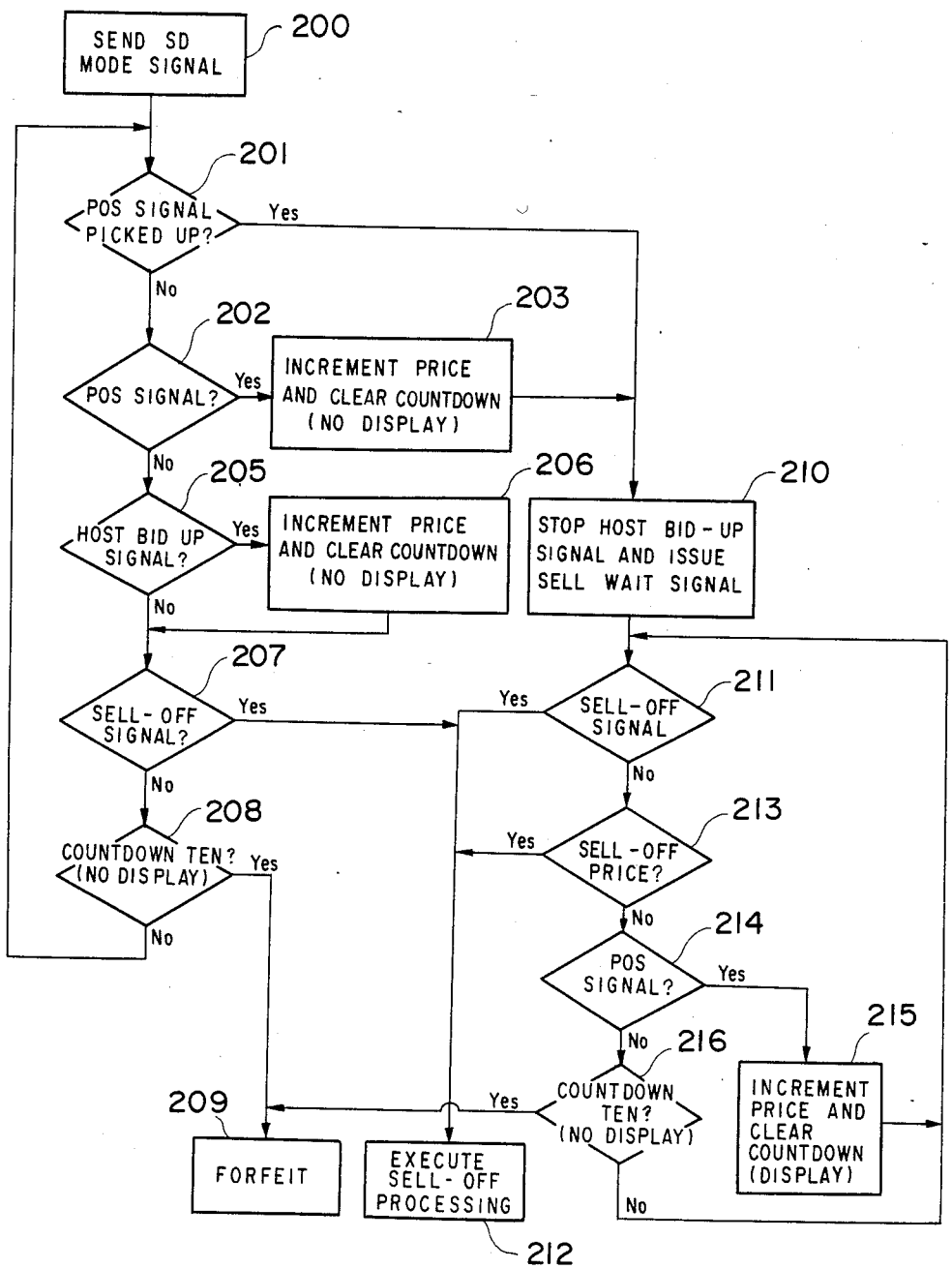
FIG. 15 is a flowchart illustrating the flow of super terminal slowdown-mode processing.

FIG. 15 is a flowchart showing the flow of super terminal slowdown mode processing. The first step (step 200) calls for the super terminal 21 (FIG. 1) to transmit a slowdown mode signal (D24 in FIG. 20). Next, it is determined at a step 201 whether a POS bid-up signal has been picked up. If the answer is NO, it is determined at a step 202 whether a POS bid-up signal is present. If the answer at the step 202 is YES, then the price is incremented and the countdown is cleared at a step 203. At the same time, this fact is displayed on the display unit 53 of the dealer terminal 50.

If a POS bid-up signal is not present at the step 202, then it is determined at a step 205 whether a host bid-up signal has arrived. If the answer is YES, then the price is incremented and the countdown is cleared at a step 206. In this case, nothing is displayed on the display unit 53.

Next, it is determined at a step 207 whether a sell-off signal has arrived. If the answer is YES, then the program proceeds to sell-off processing at a step 212; if NO, then it is determined at a step 208 whether the countdown has a value of ten. If the answer at the step 208 is NO, then the program returns to the step 201; if YES, the program proceeds to forfeit processing at a step 209.

When a POS signal is picked up at the step 201, or when the processing for incrementing the price ends at the step 203, the host bid-up signal is terminated [(a) in FIG. 6]and a sell wait signal is issued at step 210. Next, it is determined at step 211 whether a sell-off signal has arrived. If the answer is YES, the program proceeds to sell-off processing at a step 212; if NO, it is determined at step 213 whether there is a sell-off price. If the answer is YES at the step 213, the program proceeds to sell-off processing at the step 212; if NO, it is determined at step 214 whether a POS bid-up signal is present. If the answer is YES, then the price is incremented, the countdown is cleared (step 215) and the program returns to the step 211. In this case, a display appears on the display unit 53.

If a POS bid-up signal is not present at the step 14, it is determined at a step 216 whether the countdown is ten. If the answer is NO, the program returns to the step 211; if YES, then the program proceeds to forfeit processing (step 209).

Figure 16:
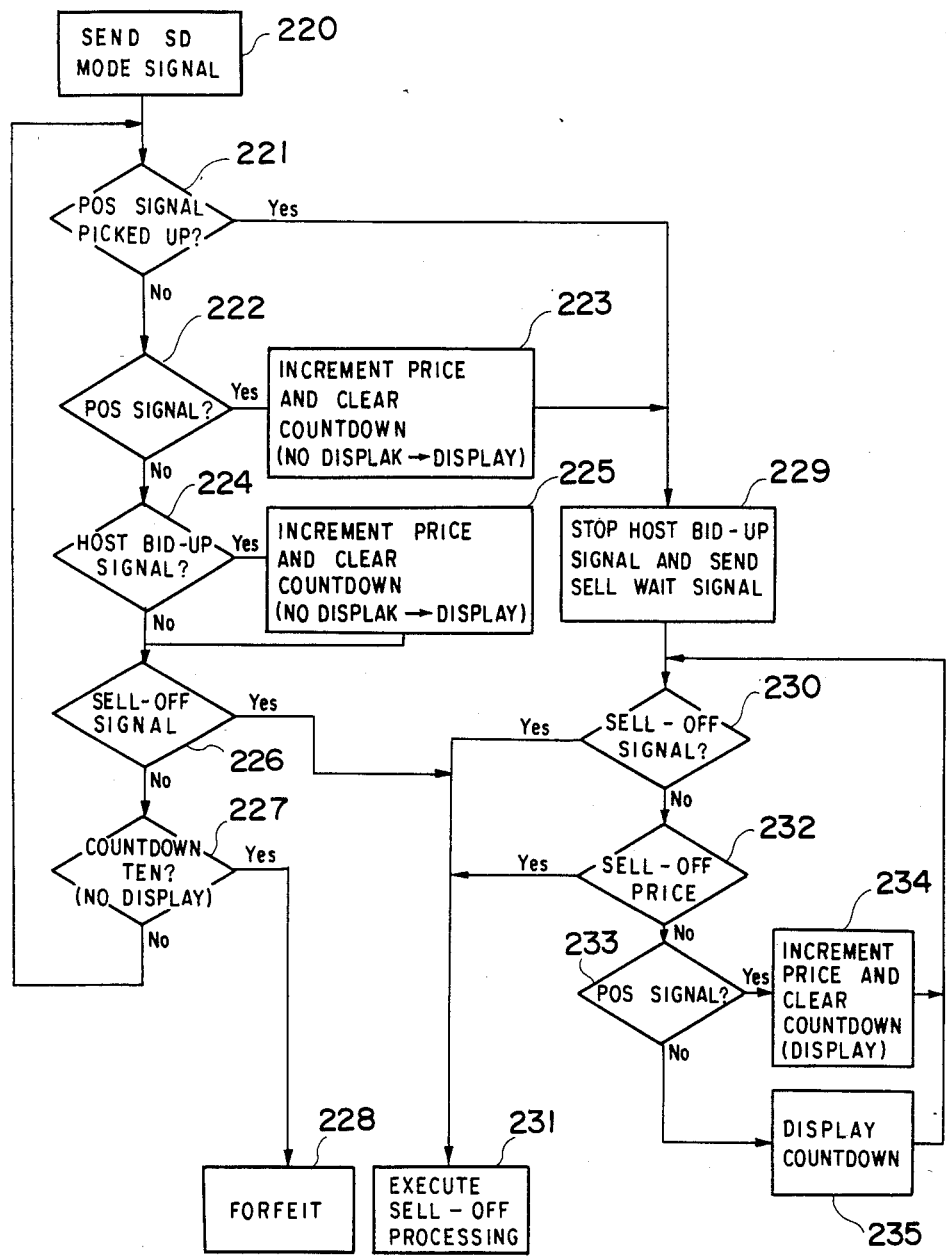
FIG. 16 is a flowchart illustrating the flow of terminal slowdown-mode processing.

FIG. 16 is a flowchart illustrating the flow of terminal slowdown-mode processing. In terminal slowdown-mode processing, the exhibiting dealer terminals 50 transmit slowdown signals (step 220), and it is determined whether a POS bid-up signal has been picked up (step 221). If the answer at the step 221 is NO, then it is determined whether a POS bid-up signal is available (step 222). If the answer is YES, the price is incremented and the countdown is cleared. In this case, the fact is displayed on the dealer terminal 50 (step 223).

If there is no POS bid-up signal at the step 222, then it is determined whether there is a host bid-up signal (step 224). If the answer at the step 224 is YES, then the price is incremented and the countdown is cleared (step 225). If there is no host bid-up signal at the step 224, it is determined whether there is a sell-off signal (step 226). If there is no sell-off signal, it is determined whether the countdown is a predetermined value (step 227). If the answer at the step 227 is NO, the program returns to the step 221.

If there is a sell-off signal at the step 226, the program proceeds to sell-off processing (step 231). If the answer at the step 227 is YES, the program proceeds to forfeit processing (step 228). If a POS signal is not picked up at the step 221, or if the processing for incrementing the price and clearing the countdown at the step 223 ends, the host bid-up signal is terminated and a sell wait signal is issued (step 229). Next, it is determined whether there is a sell-off signal (step 230). If there is, the program proceeds to sell-off processing (step 231); if there is no sell-off signal, then it is determined whether there is a sell-off price (step 232). If there is a sell-off price, the program proceeds to sell-off processing (step 231); if not, it is determined whether there is a POS signal (step 233).

If there is a POS signal, the price is incremented, the countdown is cleared, the fact is displayed on the dealer terminal 50 (step 234) and the program returns to the step 230. If there is no POS signal, then the dealer terminal 50 displays a predetermined countdown value (step 235) and the program proceeds to the step 230.

Figure 17:
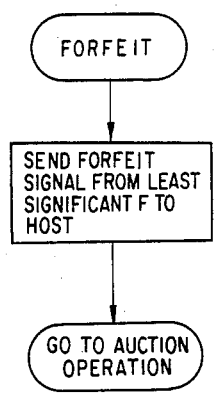
FIG. 17 is a flowchart illustrating forfeit processing.

FIG. 17 is a flowchart illustrating the flow of forfeit processing, which includes a step at which the most significant front computer 20 sends a forfeit signal (D33 in FIG. 20) to the host computer 10. The program then returns to the step 151 of FIG. 12.

Figure 18:
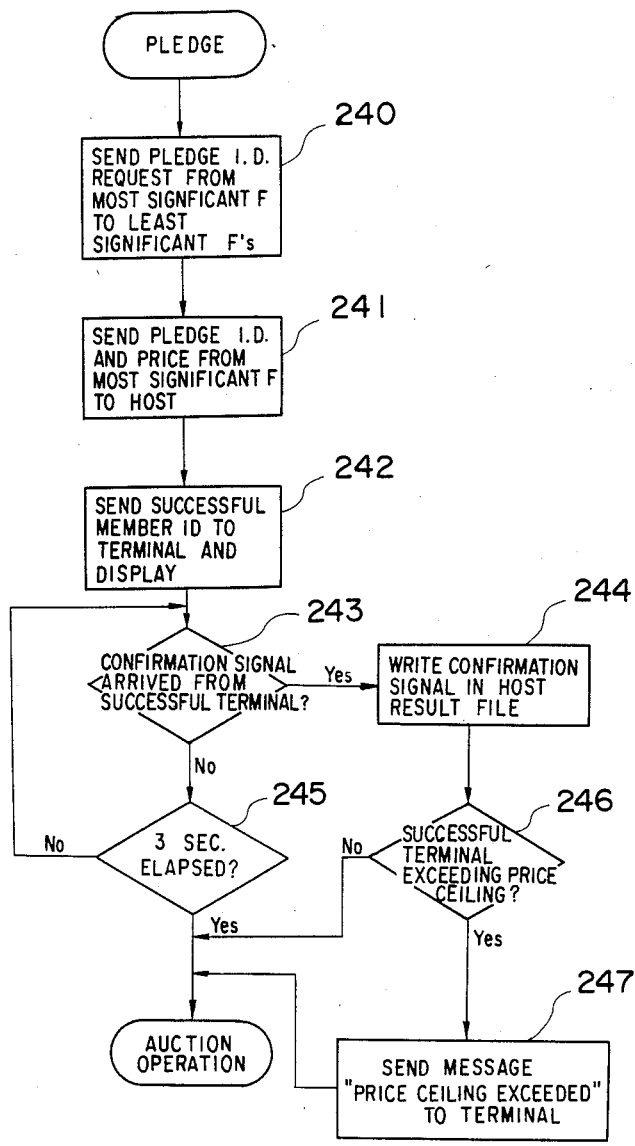
FIG. 18 is a flowchart illustrating the flow of pledge processing.

FIG. 18 is a flowchart showing the flow of pledge processing. When the program proceeds to pledge processing (see step 187 in FIG. 14) as a result of sell-off processing, the most significant front computer 20 requests that the least significant front computers 40 provide the I.D.'s (D30 in FIG. 20) of members making pledges (step 240). The least significant front computers 40 refer to the tables of FIG. 5 in the order (C) → (B) → (A) and transmit the pledging member I.D.'s from the last port numer of the ranking table shown in FIG. 4(B) to the host computer 10 via the most significant front computer 20. When a pledging I.D. arrives, the most significant front computer 20 sends this pledging member I.D. and the pledged price (D32 in FIG. 20) to the host computer 10 (step 241).

Next, the member I.D. (D31 of FIG. 20) of a successful bidder is transmitted to the dealer terminal 50 (step 242), it is determined whether a confirmation signal (D34 in FIG. 20) has arrived from the successful dealer terminal 50 (step 243). If the confirmation signal has arrived, it is written in a result file of the host computer 10 (step 244); if not, the system waits for three minutes (step 245) before the program proceeds to the next item of auction operation (step 151 in FIG. 9). When the write-in of the confirmation signal at the step 244 ends, it is determined whether the corresponding successful dealer terminal 50 has exceeded a price ceiling (step 246). If the answer is NO, the program proceeds to the next auction operation (step 151 in FIG. 9). If the price ceiling has been exceeded, a message (D36 in FIG. 20) reading PRICE CEILING EXCEEDED is sent to the corresponding dealer terminal 50 (step 247) and the program proceeds to the next auction operation.

Figure 19:
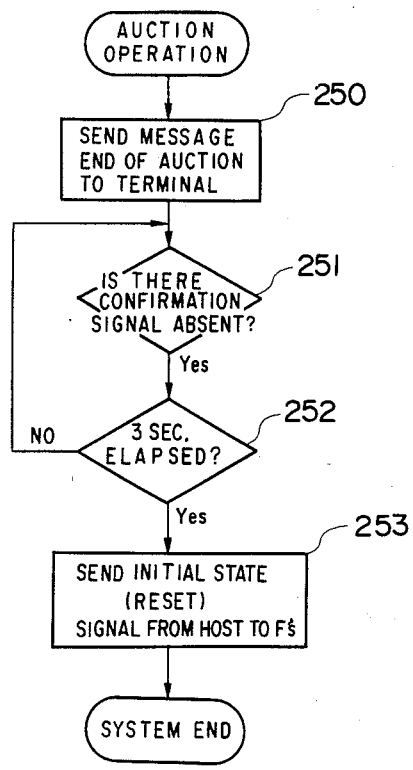
FIG. 19 is a flowchart illustrating the flow of auction termination processing.

FIG. 19 is a flowchart showing the flow of auction termination processing. In this processing, a message reading END OF AUCTION (D41 in FIG. 20), indicating that the auction has ended, is displayed at each dealer terminal 50 (step 250). Next, it is determined whether any confirmation signal has not arrived and the system waits for three minutes (steps 251, 252). In the absence of a confirmation signal, the host computer 10 sends an initial reset signal (D40 in FIG. 20) to the most significant front computer 20, intermediate front computers 30 and least significant front computers 40 (step 253), whereby the auction information transmission system is shut down.

FIG. 21 is a flowchart illustrating the flow of POS bid-up signal selection processing in the front computers 20, 30, 40. When bidding has started, it is determined whether POS signals are arriving (step 301). If POS signals are arriving, it is determined how many times they arrive in 300 msec (step 302). If a POS signal arrives once, a seven-bit price-up signal ① of the kind shown in FIG. 22 is transmitted; if the signal arrives twice, the price-up signal ② is transmitted; if the signal arrives three times, the price-up signal ③ is transmitted (steps 303, 304, 305). If the signal arrives four or more times, the price-up signal is not transmitted (step 306). Next, the port number of the ranking table is updated (step 307 [see FIG. 4(B)]. If a NO answer is received at the step 301, it is determined whether time is up (step 308). If the answer at the step 308 is NO, the program returns to the step 301; if YES, the program proceeds to pledge processing or forfeit processing.

In accordance with the illustrated embodiment as described above, an auction information transmission processing system is constructed by connecting the single most significant front computer 20 to the host computer 10, connecting the plurality of intermediate front computers 30 and the plurlity of least significant front computers 40 to the most significant front computer 20 via the leased telecommunication lines 60 and 70 in a tree-like configuration, and connecting the plurality of dealer terminals 50 to each of the least significant front computers 40 via the public telephone lines 80. As a result, the system can be utilized with ease without widely scattered auction participants gathering at a single location.

Further, in each of the dealer terminals 50, pattern data indicative of basic display pictures of the kind shown in FIGS. 23(A)–(E) are stored in the ROM 57, and various data relating to the used cars submitted for auction are stored on laser disks, which can then be distributed in advance as by a private delivery service. Therefore, when an auction is held, the host computer 10 need only issue a signal which causes the basic display picture data and used car data to be looked up, and it is unnecessary for the host computer 10 to send these data to the dealer terminals 50. As a result, the amount of data transmitted can be greatly reduced.

By the time bidding starts, the host computer 10 transmits the data necessary for holding an auction, such as line connection data and registered member data, through an ordinary transmission procedure. After bidding starts, the exchange of signals between the front computers 20, 30, 40 and the dealer terminals 50 takes place without the participation of the host computer 10. Moreover, each of the front computers selects a predetermined number solely of the bid-up signals within a predetermined period of time and these signals are sent as signals having the minimum number of bits to the front computers of higher significance. This results in a further reduction in the amount of data processed among the front computers, thereby shortening even further the time needed for data transmission processing. Accordingly, auction participants scattered over a wide area need not gather at a predetermined location, as in the prior art, and these persons can participate on a real-time basis without leaving their own locations.

Since the amount of transmitted data is greatly reduced and the data are transmitted as signals having a small number of bits, lines having a small capacity can be utilized as the leased telecommunication lines 60 and 70. This makes it possible to construct the auction information transmission processing system very inexpensively.

Though the above-described embodiment relates to an auction of used cars, the auction information transmission processing system is not limited to used cars but can be applied to the auctioning of various articles.

Further, in the aforementioned embodiment, each dealer terminal 50 is provided with the display unit 53 and laser disks storing the article data are distributed by a private delivery service. However, the method through which these data are stored in each dealer terminal 50 is not limited to the above. A variety of storage means, such as magnetic storage devices, can be used as a matter of course. In addition, the article data can be stored in the dealer terminals 50 by utilizing an artificial communications satellite or the like to transmit the data to the dealer terminals 50. In such case, the article data can be transmitted to the dealer terminals 50 whenever an auction is held, and bidding can proceed while the data are displayed on the display screens.

According to the invention as set forth above, each dealer terminal of the auction information transmission processing system is provided with a storage device in which data indicative of the article to be auctioned off are stored in advance. When an auction is to be held, therefore, the host computer need only transmit a signal which causes these data to be looked up. This makes it possible to reduce the amount of data transmitted by the host computer. By the time bidding starts, the host computer transmits the data necessary for holding an auction, such as line connection data and registered member data, through an ordinary transmission procedure. After bidding starts, the exchange of signals between the front computers and the dealer terminals takes place without the participation of the host computer. Moreover, each of the front computers selects a predetermined number solely of the bid-up signals within a predetermined period of time and these signals are sent to the front computers of higher significance. This results in a further reduction in the amount of data processed among the front computers, thereby shortening even further the time needed for data transmission processing. Accordingly, auction participants scattered over a wide area need not gather at a predetermined location, as in the prior art, and these persons can participate on a real-time basis without leaving their own locations.

As many apparently widely different embodiments of the present invention can be made without departing from the spirit and scope thereof, it is to be understood that the invention is not limited to the specific embodiments thereof except as defined in the appended claims.

What we claim is:

1. In an auction information transmission processing system constructed by connecting a most significant front computer to a host computer, arranging at least one stage of a plurality of intermediate front computers and a plurality of least significant front computers so as to be connectable to said most significant front computer in a tree-like configuration via communication lines, and arranging a plurality of dealer terminals so as to be connectable to each of said least significant front computers via communication lines, an information transmission processing system characterized in that each of said dealer terminals has basic pattern data storage means storing pattern data indicative of basic display screen pictures and exhibit data storage means storing data peculiar to articles on exhibit at an auction, and wherein when the system is started up, said host computer transmits a line connection signal to said front computers, wherein said host computer is connected to each of said front computers, said host computer then transmits auction data such as member registration data to said least significant front computers and said auction data are stored in these least significant front computers, said dealer terminals and said least significant front computers are connected, and data are extracted from said basic pattern storage means and said exhibit data storage means of said dealer terminals, and said extracted data are displayed on corresponding display screens, in response to a command from said host computer.

2. The information transmission processing system according to claim 1, characterized in that after bidding starts, each of said front computers, in response to a command from said host computer, selects a predetermined number solely of bid-up signals, input thereto in a predetermined period of time, from each of said dealer terminals and transmits these signals to a front computer of higher significance, said most significant front computer selects only a predetermined number of bid-up signals input thereto in a predetermined period of time and bids up a price of an exhibit being auctioned, and after a pledge to buy an exhibit is made, said least significant front computers identify pledging members based on the member registration data, and data indicative of these members are transmitted to the front computers of higher significance.

3. The information transmission processing system according to claim 1 or 2, characterized in that at least data indicative of the actual picture of an exhibit are stored in said exhibit data storage means of each of said dealer terminals.

4. An information transmission processing system according to any one of claim 1 or 2, wherein said exhibit data storage means is a general-purpose storeage means which stores a variety of exhibit data, said exhibit data being transmitted to each of said dealer terminals utilizing a transmission means.

5. The information transmission processing system according to any one of claims 1 or 2, characterized in that an artificial communications satellite is utilized to store a variety of exhibit data in said exhibit data storage means of each of said dealer terminals.

* * * * *